(12) United States Patent
Tucker

(10) Patent No.: US 11,538,473 B2
(45) Date of Patent: Dec. 27, 2022

(54) PROCESSING AND VISUALISING AUDIO SIGNALS

(71) Applicant: Sonocent Limited, Leeds (GB)

(72) Inventor: Roger Tucker, Leeds (GB)

(73) Assignee: Sonocent Limited, Leeds (GB)

(*) Notice: Subject to any disclaimer, the term of this patent is extended or adjusted under 35 U.S.C. 154(b) by 39 days.

(21) Appl. No.: 16/979,072

(22) PCT Filed: Apr. 16, 2020

(86) PCT No.: PCT/GB2020/050963
§ 371 (c)(1),
(2) Date: Sep. 8, 2020

(87) PCT Pub. No.: WO2020/212703
PCT Pub. Date: Oct. 22, 2020

(65) Prior Publication Data
US 2021/0158818 A1    May 27, 2021

(30) Foreign Application Priority Data
Apr. 17, 2019   (GB) ...................................... 1905445

(51) Int. Cl.
*G10L 15/22*    (2006.01)
*G06F 3/16*    (2006.01)
(Continued)

(52) U.S. Cl.
CPC .............. *G10L 15/22* (2013.01); *G06F 3/167* (2013.01); *G10L 15/1822* (2013.01);
(Continued)

(58) Field of Classification Search
CPC ..... G10L 15/22; G10L 15/1822; G10L 17/26; G10L 25/87; G10L 2015/223; G10L 25/78; G10L 15/26; G06F 3/167
(Continued)

(56) References Cited

U.S. PATENT DOCUMENTS 5,143,078 A * 9/1992 Mather .................. A61B 7/003
                                              600/529
6,064,964 A * 5/2000 Yamamoto .............. G10L 25/78
                                              704/E11.003

(Continued)

OTHER PUBLICATIONS

Fukuda Takashi et al: "Detecting breathing sounds in realistic Japanese telephone conversations and its application to automatic speech recognition",Speech Communication, Elsevier Science Publishers, Amsterdam, NL, vol. 98, Feb. 2, 2018 (Feb. 2, 2018), pp. 95-103, XP085361384,ISSN: 0167-6393.*

(Continued)

*Primary Examiner* — Thuykhanh Le
(74) *Attorney, Agent, or Firm* — Dinsmore & Shohl LLP

(57) ABSTRACT

The present disclosure relates to methods, computer programs, and computer-readable media for processing a voice audio signal. A method includes receiving, at an electronic device, a voice audio signal, identifying spoken phrases within the voice audio signal based on the detection of voice activity or inactivity, dividing the voice audio signal into a plurality of segments based on the identified spoken phrases, and in accordance with a determination that a selected segment of the plurality of segments has a duration, $T_{seg}$, longer than a threshold duration, $T_{thresh}$, identifying a most likely location of a breath in the audio associated with the selected segment and dividing the selected segment into sub-segments based on the identified most likely location of a breath.

17 Claims, 4 Drawing Sheets

(51) Int. Cl.
*G10L 15/18* (2013.01)
*G10L 17/26* (2013.01)
*G10L 25/87* (2013.01)

(52) U.S. Cl.
CPC .............. *G10L 17/26* (2013.01); *G10L 25/87* (2013.01); *G10L 2015/223* (2013.01)

(58) Field of Classification Search
USPC ........................................................ 704/257
See application file for complete search history.

(56) References Cited

U.S. PATENT DOCUMENTS

| | | | | |
|---|---|---|---|---|
| 6,067,514 | A * | 5/2000 | Chen ................... | G10L 15/18 704/235 |
| 7,529,670 | B1 * | 5/2009 | Michaelis ............. | A61B 5/091 704/275 |
| 9,002,705 | B2 * | 4/2015 | Yoshida ................ | G06F 40/30 379/88.04 |
| 2003/0220570 | A1 * | 11/2003 | Ragnarsdottir ...... | A61B 5/1135 600/450 |
| 2006/0279428 | A1 * | 12/2006 | Sato ..................... | A61B 5/1135 340/575 |
| 2007/0118374 | A1 * | 5/2007 | Wise ...................... | G10L 21/06 704/235 |
| 2007/0287896 | A1 * | 12/2007 | Derchak .............. | A61B 5/1135 600/301 |
| 2008/0005838 | A1 * | 1/2008 | Wan Fong ........... | A61B 5/7257 5/600 |
| 2009/0299430 | A1 * | 12/2009 | Davies ................. | A61B 5/1135 128/204.23 |
| 2010/0061596 | A1 * | 3/2010 | Mostafavi ............ | A61B 5/113 382/209 |
| 2010/0152600 | A1 * | 6/2010 | Droitcour ............. | A61B 5/1113 600/534 |
| 2010/0298730 | A1 * | 11/2010 | Tarassenko ........... | A61B 5/0816 703/2 |
| 2011/0230778 | A1 * | 9/2011 | Lai ....................... | A61B 5/4818 600/529 |
| 2012/0101400 | A1 * | 4/2012 | Kurosawa ............. | A61B 5/0809 600/533 |
| 2012/0289852 | A1 * | 11/2012 | Van Den Aardweg ..................... A61B 5/085 600/533 |
| 2013/0281874 | A1 * | 10/2013 | Nishida ................ | A61B 7/003 600/534 |
| 2013/0335257 | A1 * | 12/2013 | Abrahamson .......... | G01S 13/56 342/22 |
| 2014/0142933 | A1 * | 5/2014 | Ye ........................ | G10L 21/0316 704/225 |
| 2015/0139431 | A1 * | 5/2015 | Gohara .................... | H04R 3/00 381/56 |
| 2015/0206544 | A1 | 7/2015 | Carter | |
| 2015/0369911 | A1 * | 12/2015 | Mabrouk .............. | G01S 13/888 342/159 |
| 2016/0300587 | A1 * | 10/2016 | Nishimura ............. | G10L 15/04 |
| 2017/0055877 | A1 * | 3/2017 | Niemeyer ............ | A61B 5/0077 |
| 2017/0186446 | A1 * | 6/2017 | Wosk ....................... | G01C 5/06 |
| 2018/0308524 | A1 * | 10/2018 | Muyal .................... | G11B 27/34 |
| 2018/0374496 | A1 * | 12/2018 | Shi ....................... | G10L 21/0208 |
| 2019/0180738 | A1 * | 6/2019 | Kim ....................... | H04R 3/005 |
| 2019/0258315 | A1 * | 8/2019 | Djokovic .............. | A61B 5/1102 |
| 2019/0304460 | A1 * | 10/2019 | Gunn .................... | G06F 1/3206 |
| 2019/0320939 | A1 * | 10/2019 | Orvis .................... | A61B 5/746 |
| 2019/0392840 | A1 * | 12/2019 | Nakagome ............ | G10L 15/22 |
| 2020/0204895 | A1 * | 6/2020 | Wendling ............ | A61M 16/026 |
| 2021/0110814 | A1 * | 4/2021 | Iwase .................. | G10L 15/1815 |
| 2021/0225477 | A1 * | 7/2021 | Kay ...................... | A61B 5/087 |
| 2022/0039742 | A1 * | 2/2022 | Hilmisson .......... | A61B 5/14542 |
| 2022/0075050 | A1 * | 3/2022 | Shouldice ............. | A61B 5/117 |

OTHER PUBLICATIONS

Canadian first Office Action cited in Canadian Application No. 3,092,604 dated Oct. 1, 2020, 3 pages.

UKIPO Combined Search and Examination Report under Sections 17 and 18(3) for European Application No. 1905445.1 dated Oct. 17, 2019, 5 pages.

PCT International Search Report and Written Opinion of the International Searching Authority for PCT/GB2020/050963, dated Jun. 26, 2020, 14 pages.

Dumpala, Sri Harsha et al. "An Algorithm for Detection of Breath Sounds in Spontaneous Speech with Application to Speaker Recognition." International Conference on Speech and Computer, SPECOM 2017, LNCS, vol. 10458, pp. 98-108. Springer, Cham, Aug. 13, 2017, https://doi.org/10.1007/978-3-319-66429-3_9.

Fukuda, Takashi et al. "Detecting breathing sounds in realistic Japanese telephone conversations and its application to automatic speech recognition." Speech Communication, Elsevier B.V., vol. 98, Feb. 2, 2018, pp. 95-103. https://doi.org/10.1016/j.specom.2018.01.008.

\* cited by examiner

PROCESSING AND VISUALISING AUDIO SIGNALS

CROSS REFERENCE TO RELATED APPLICATIONS

The present application is a National Phase Entry of International Application No. PCT/GB2020/050963, entitled "PROCESSING AND VISUALISING AUDIO SIGNALS" and filed on Apr. 16, 2020, which claims priority to Great Britain Application No. 1905445.1, filed Apr. 17, 2019, both of which are incorporated by reference herein in their respective entireties.

FIELD OF THE INVENTION

The invention relates to a method of processing audio signals, and in particular to a method of processing voice audio signals by identifying spoken phrases within the voice audio signal.

BACKGROUND

Traditionally, notetaking has been performed by making hand-written notes whilst listening to information, such as a lecture or meeting. With the advent of mobile computing devices, it is now easier to make a recording of the lecture or meeting, which can be replayed later. Electronic notetaking systems can go further, and can analyse the recorded speech for the user, and can present the user with a visualisation of the recorded speech. In particular, the recorded speech can be split into segments, with each segment comprising one spoken phrase. The user can then easily interact with the recording on a phrase-by-phrase basis. Such segmentation and visualisation systems are described in references [1] and [2].

In references [1] and [2], the visualization is performed after the recording is complete, in order to aid playback and editing. However, it may be desirable to provide visualisation of the speech as the recording is being made, enabling live annotation of the recording. This facilitates a form of live notetaking which does not require writing or typing words, which is very powerful for people with dyslexia and other learning disabilities. The Audio Notetaker by Sonocent Limited provides such a live notetaking system. In this system, each speech segment is represented as a thin block on a computer or mobile device screen. Each block is a visual unit that can be annotated and edited. When visualized in real-time, each block grows whilst a phrase is being spoken, and is finished shortly after the speaker pauses. This provides a good perceptual link between the audio phrases heard and the blocks seen on the visual display.

Conventionally, the recorded audio is segmented into spoken phrases based on when a pause in the speech is detected. However, identifying a pause can be difficult, for example where recordings are made in a fairly noisy environment, or where the speaker is quite distant, as is typically found in a lecture theatre or conference centre. Usage in such environments is referred to as "Ambient-Speech Visualization" (ASV). It can also be difficult to identify pauses where a speaker speaks too quickly, or too quietly. As a result, the segments of speech determined by the notetaking tool may not match the actual division of phrases in the speech.

SUMMARY OF THE INVENTION

According to a first aspect of the invention there is provided a method of processing a voice audio signal, the method comprising:

receiving, at an electronic device, a voice audio signal;
identifying spoken phrases within the voice audio signal;
dividing the voice audio signal into a plurality of segments based on the identified spoken phrases, wherein dividing the voice audio signal into a plurality of segments comprises determining a start time and an end time in the voice audio signal for each segment; and
in accordance with a determination that a selected segment of the plurality of segments has a duration, $T_{seg}$, longer than a threshold duration, $T_{thresh}$:
identifying a most likely location of a breath in the audio associated with the selected segment; and
dividing the selected segment into sub-segments based on the identified most likely location of a breath.

In particular, identifying spoken phrases within the voice audio signal may comprise identifying spoken phrases within the voice audio signal based on the detection of voice activity or inactivity. For example, spoken phrases may be identified by identifying pauses in the voice audio signal.

As discussed above, it can be difficult in certain environments to identify pauses in the voice audio signal, and so phrases within the speech may not be identified correctly. In the present invention, however, if it is determined that a segment has grown too long, then a further segmentation process is performed. The method assesses a long segment to identify the most likely location during the segment at which the speaker took a breath. The long segment is then split into sub-segments based on that most likely location.

The present invention relies on the realisation that in a long segment of audio, it is highly likely that the speaker took a breath. Searching for the most likely location of this breath, and segmenting on the basis of this location, means that the method is likely to correctly segment the audio based on the actual phrases in the speech. The method of the present invention therefore can provide reliable audio segmentation even in noisy environments.

Dividing the voice audio signal may comprise separating the signal into individual files, or may comprise recording the start time and end time of each segment, for example in a data file associated with the voice audio signal. Dividing the selected segment into sub-segments may comprise dividing the selected segment into two or more small segments which, when added together, form the selected segment (i.e. when added together have the same duration and audio content as the selected segment).

In some embodiments, the method may be performed after recording of the voice audio signal has been completed. Alternatively, the method may be performed whilst the voice audio signal is still being recorded, for example during live recording of a lecture or meeting. In either case, the determination that a particular segment has a duration greater than the threshold duration may be performed simultaneously with the process of identifying that segment—i.e. before the final segment duration is known.

Dividing the voice audio signal into a plurality of segments may comprise determining a start time and an end time in the voice audio signal for each segment. In some embodiments, the determination that a selected segment has a duration longer than the threshold duration may be performed before the end time of the selected segment has been determined. Thus it may be identified that the segment has grown too long even whilst the segment of speech is still being recorded.

In some embodiments, identifying a most likely location of a breath may comprise searching the audio associated with the selected segment between a first time limit and a second time limit for the most likely location of a breath.

The first time limit may be a predefined minimum phrase duration, $T_{min}$, after the start time of the selected segment. The second time limit may be a predefined maximum phrase duration, $T_{max}$, after the start time of the selected segment. The minimum and maximum phrase durations may represent an expected minimum and maximum duration respectively of a phrase in normal speech, for example for an average person.

In some embodiments, the threshold duration may equal the predefined maximum phrase duration, $T_{max}$.

In alternative embodiments, the threshold duration, $T_{thresh}$, may equal the sum of the minimum phrase duration, $T_{min}$, and the maximum phrase duration, $T_{max}$. Using such a threshold ensures that the sub-segments created by identifying the likely location of the breath cannot be shorter than the minimum phrase duration. This is particularly important where it is not known what the final duration of the selected segment will be.

In such embodiments, the threshold duration may be a first threshold duration, and the method may further comprise:
  after determining the end time of the selected segment, and in accordance with a determination that the duration of the selected segment does not exceed the first threshold duration:
    determining if the duration of the selected segment exceeds a second threshold duration, wherein the second threshold duration is less than the first threshold duration; and
    if the segment duration exceeds the second threshold duration:
      identifying a most likely location of a breath in the audio associated with the selected segment; and
      dividing the selected segment into sub-segments based on the identified most likely location of a breath.

As noted above, when the final duration of the selected segment is not yet known, a longer threshold may be necessary to ensure that the resulting sub-segments are not shorter than the minimum phrase duration. However, once the recording of the selected segment is complete, and its duration is known, the segment can be compared to a second, lower threshold duration. If the segment is longer than this second threshold duration, the sub-segmentation process can then be performed.

In some such embodiments, identifying the most likely location of a breath in the audio associated with the selected segment may comprise searching the audio associated with the selected segment between the first time limit (i.e. the minimum phrase duration) and a third time limit for a most likely location of a breath. The third time limit may equal to the duration of the selected segment, $T_{dur}$, minus the minimum phrase duration, $T_{min}$. This ensures that the resulting sub-segments do not have a length less than the minimum phrase duration.

In some such embodiments, the second threshold duration equals the maximum phrase duration, $T_{max}$.

In any of the above embodiments, the predefined minimum phrase duration, $T_{min}$, may be in the range 0.3-2 seconds or 0.5-1.5 seconds.

In any of the above embodiments, the predefined maximum phrase duration, $T_{max}$, may be in the range 5-10 seconds or 7-9 seconds.

In some embodiments, the method may comprise determining if an end point of the selected segment is known, and selecting a value for the threshold duration based on this determination. In particular, if the end point is known, the threshold duration may be set to the maximum phrase duration, $T_{max}$. If the end point is not yet known, the threshold duration may be set to the sum of the maximum phrase duration, $T_{max}$, and the minimum phrase duration, $T_{min}$. After setting the threshold in this way, the method may proceed based on any of the embodiments described above in relation to that choice of threshold. In particular, the audio may be searched for a most likely location of the breath using the time windows described above in respect of each of these choices of threshold duration.

In some embodiments, identifying a most likely location of a breath in the audio associated with the selected segment may comprise identifying a minimum signal energy in the audio associated with the selected segment. For example, the absolute energy minimum of the selected segment of the audio signal may be identified.

In some embodiments, identifying a minimum signal energy may comprise searching the audio associated with the selected segment for the minimum signal energy within a moving time window. The duration of the time window may for example be in the range 250-500 ms.

Some embodiments may further comprise applying a low-pass filter to the audio associated with the selected segment prior to identifying a most likely location of a breath. The low-pass filter may be applied to the voice audio signal as a whole, or may be applied individually to selected segment. The cut-off frequency of the low-pass filter may for example be in the range 3-4 kHz, or may be 3.4 kHz. Such filtering may remove higher frequency noises, such as breathing, from the voice audio signal, and so may facilitate the identification of spoken phrases in the audio.

In some embodiments the method may further comprise displaying, on a display of the electronic device, a visual representation of the segments and sub-segments.

According to a second aspect of the invention there is provided a computer program configured to perform the method of any embodiment of the first aspect.

According to a third aspect of the invention there is provided a computer readable medium comprising instructions which, when executed by a computer, cause the computer to carry out the method of any embodiment of the first aspect.

BRIEF DESCRIPTION OF THE DRAWINGS

By way of example only, certain embodiments of the invention shall now be described by reference to the accompanying drawings, in which.

DETAILED DESCRIPTION

Figure 1:
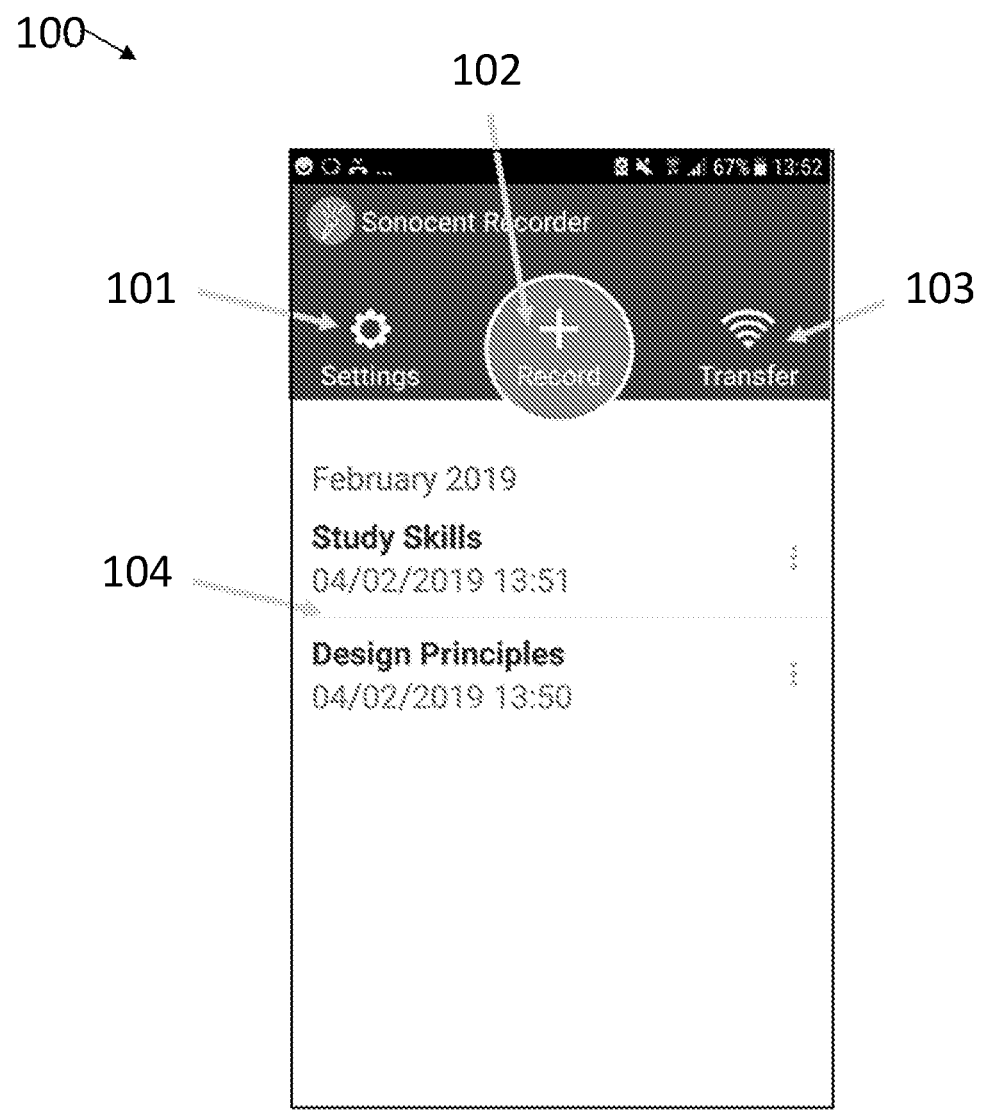
FIG. 1 is an illustration of a user interface of a notetaking application.

FIG. 1 illustrates a user interface 100 of an electronic notetaking application running on an electronic device. The electronic notetaking application may be the Audio Notetaker or Sonocent Recorder provided by Sonocent Limited.

User interface 100 comprises three user-selectable buttons: a settings button 101; a start recording button 102; and a transfer button 103. The transfer button 103 may be used to transfer the recorded audio to a complementary application, for example running on different electronic device. User interface 100 also comprises a list of previous recordings 104, which can be selected to open the recording. Recording of a voice audio signal is started by pressing the record button 102.

Audio is captured by the electronic device and passed as raw data to a voice activity detector (VAD). An exemplary voice activity detector is described in reference [3], which is incorporated herein by reference.

The VAD analyses the incoming audio signal to identify complete phrases within the spoken words based on identifying pauses in the speaker's speech. The VAD identifies a segment of the audio signal corresponding to a phrase by determining a segment start and end time. The VAD then delivers the segment start and end times to a user interface module. The user interface module determines what to display in user interface 100 and user interface 200, described below. The start and end times may be delivered in real time, or near-real time, during a live audio recording. A short delay in delivering the times may be caused by various post-processing stages in the VAD.

As discussed in more detail below, the present invention identifies sub-segments in the audio signal. This may be achieved by intercepting the segment information from the VAD, and determining sub-segment start and end times where necessary to avoid overly long segments. These original and sub-segment start times can then be delivered to the user interface module to be displayed to the user. Although such extra processing may add extra delay, for example of a few seconds, the delay does not look out of place because the user is accustomed to a delay between the phrase end and the display showing the end of the block.

Figure 2:
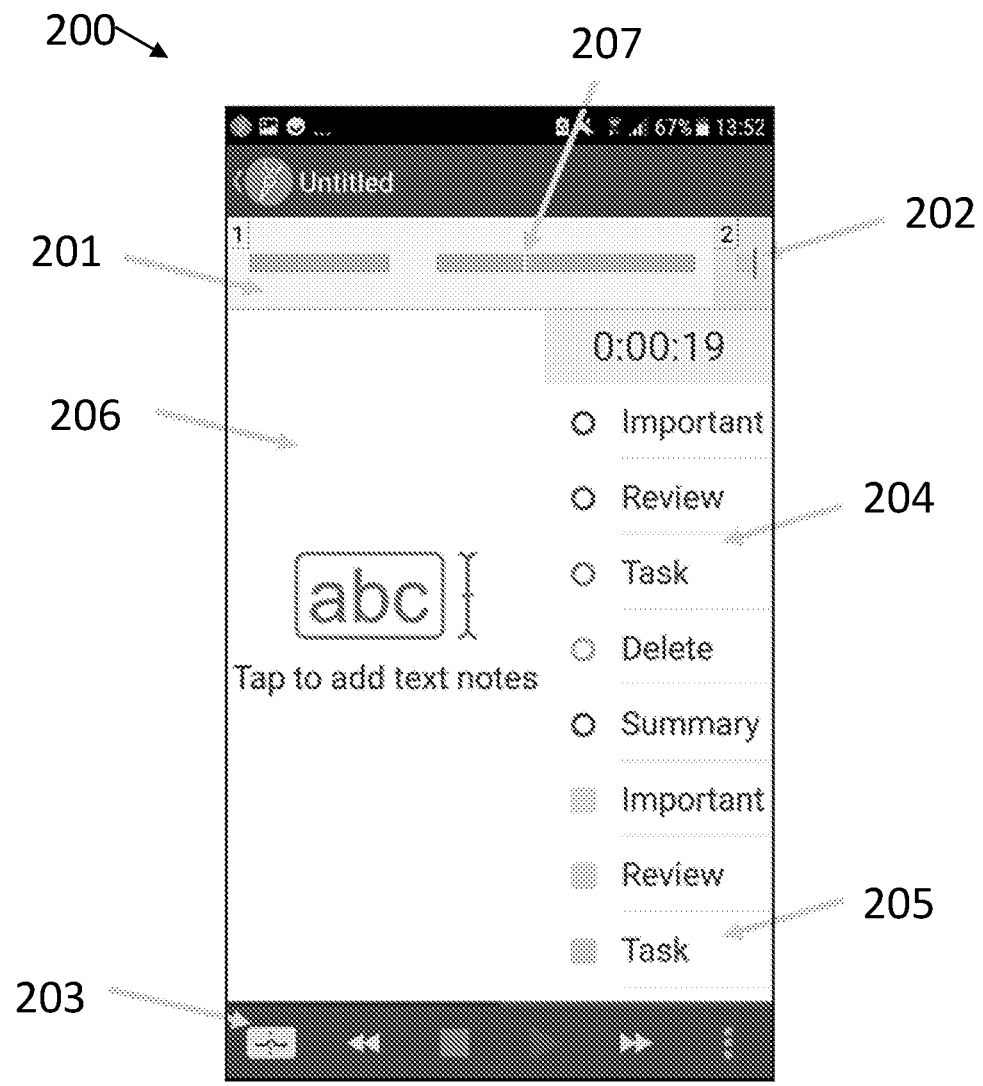
FIG. 2 is an illustration of a user interface of a notetaking application in a recording mode.

When recording is started the display switches to the recording screen user interface 200 shown in FIG. 2. A cursor 202 showing the current position in time starts to move across the audio display 201 from the left. Once the VAD delivers a segment start time, the user interface module starts drawing a block behind the cursor as it moves, and the block grows in length as the cursor moves.

When the user interface module receives an end of segment time, it finishes the current block; and when it receives a start of segment time it starts a new block. When these times are generated by some embodiments of the present invention, they are delivered one straight after the other, and drawn in the specified place in the display. Note that the start and end of blocks are not drawn where the cursor is, as they are always in the past due to the processing delay in the VAD.

Once the cursor has reached the right hand side of the screen, the audio display moves continually to the left, keeping the cursor on the right hand side of the screen.

The user can annotate the display in a number of ways. They can insert a section break using the button 203, colour a block or series of blocks using the colour buttons 204, or colour a whole section using the section colouring buttons 205. The colours can be used to identify certain categories of phrases or sections. A key to the meaning of the colours can be changed by the user in the settings menu. The user can also add text into the notes pane 206. There may be a number of other annotation options, for example including taking a photo, loading up slides, scribbling and/or adding a pre-existing photo.

Once complete, the recording can be saved, and/or transferred to another computing device. For example, where the recording has been made using a mobile phone, the completed audio may be transferred to a computer.

As discussed above, it can be difficult for the VAD to determine the location of a pause in the speech, leading to the misidentification of phrases, especially in noisy environments such as lecture theatres. Speech segmentation for such ambient-speech visualisation (ASV) environments requires a sensitive voice activity detector able to distinguish a speaker, at a distance, from all the background noise of the room. The main aims of an ASV-VAD are:

1. The segments should correspond to perceived phrases as closely as possible. It is important that speech phrases and the gaps between them are visualised in an intuitive way. This not only helps the auditory to visual link, but is important for editing.

2. False negatives (missed phrases) should be avoided, if necessary in favour of false positives (blocks of non-speech noise) which are acceptable, as long as something obvious has caused them, else they appear as spurious malfunctions of the system.

However, in noisy environments, these two aims come into direct conflict with one another. To achieve aim (2), a VAD which can reliably detect all speech in the presence of noise is required, so the detection threshold needs to be low. To achieve aim (1), the VAD needs to also reliably detect all the pauses between spoken phrases, else the phrases get joined together. But a VAD cannot do both, especially in acoustic environments where other people are talking in the background, such as talks at exhibitions. Its detection threshold will either be low, in which case it will tend to miss pauses, or high in which case it will tend to miss speech. The problem of joining phrases together is greatly exacerbated by the necessary use of "Hangover"—where the VAD stays on after the end of speech to allow for quiet speech that is below the level of the noise.

There have been many decades of research into VADs, however, none of this research helps solve this conflict, because for all other applications of a VAD only the second aim is important, and it doesn't matter if the pauses between phrases are missed. It is only a problem for speech visualisation, where a strong correspondence between spoken phrases and the visualised equivalent is required.

It is noted that the real-time ASV described herein contrasts with the audio file visualisation system for voice messages described in U.S. Pat. No. 6,055,495 (A). In that system the main concern was to reduce the number of pauses, as too many were being found using a simple VAD on clean audio, and being a non-real-time system it could do this by processing the whole file at once and selecting only the longest or deepest pauses. But an ASV system rarely displays too many pauses because of the highly sensitive VAD required, and instead it is the opposite problem of too few pauses that needs solving.

The present invention seeks to overcome such problems, by splitting overly long segments into shorter sub-segments based on the most likely location of a breath in the audio signal. The invention may be implemented in a notetaking software application as an extra component to the visualization system, which operates on the output of the VAD. This component ensures that even with the most sensitive VADs, sufficient pauses are found between segments to give an effective audio to visual correspondence for perception and for editing.

The invention uses the fact that humans need to breathe whilst speaking, and so after a certain duration of a segment, it is safe to assume that somewhere in that segment there must be a breath.

Figure 3:
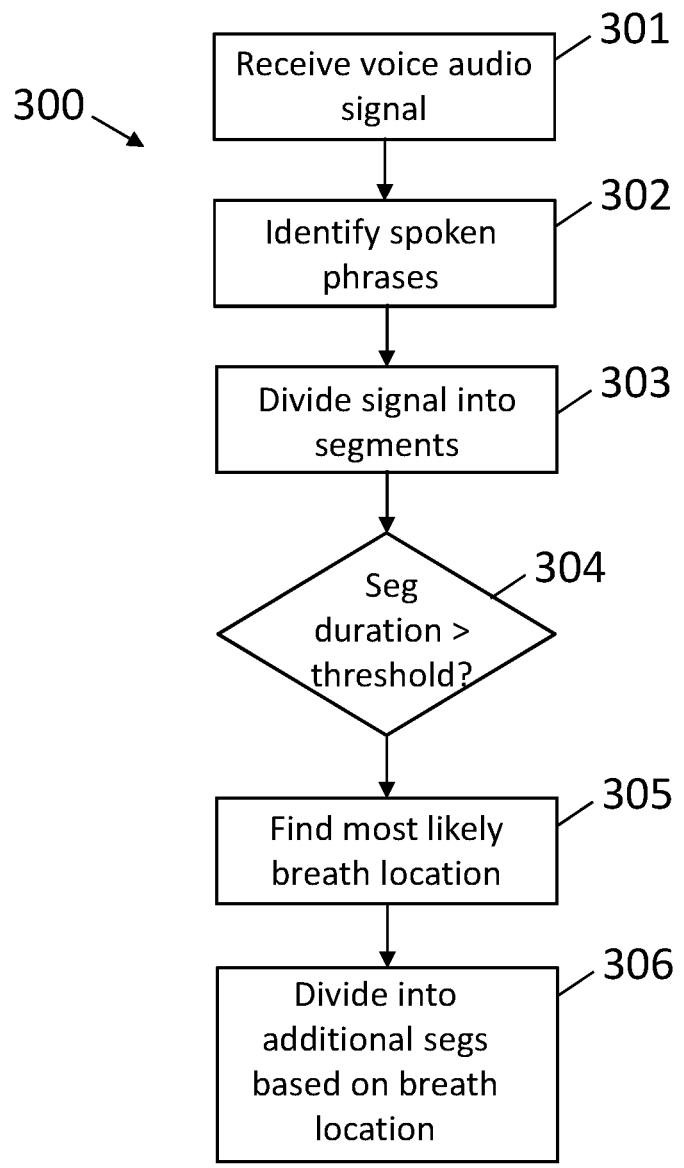
FIG. 3 illustrates a method of processing audio according to the present invention.

FIG. 3 illustrates a method 300 of processing a voice audio signal according to the present invention.

At step 301, a voice audio signal is received at an electronic device. The voice audio signal may be a live recording, as described above. Alternatively, receiving the audio signal may comprise receiving a pre-recorded audio signal, such a recording that has already been completed and saved to the electronic device for later processing.

At step 302, spoken phrases are identified within the voice audio signal. The spoken phrases may be identified by a voice activity detector (VAD), as described above. In particular, spoken phrases may be identified by detecting voice activity or inactivity in the voice audio signal, such as by detecting pauses in the speaker's speech. In particular, spoken phrases may be identified by detecting voice activity or inactivity in the voice audio signal, such as by detecting pauses in the speaker's speech.

At step 303, the voice audio signal is divided into a plurality of segments based on the identified spoken phrases. Dividing the voice audio signal into a plurality of segments comprises determining (for example by the VAD) a start time and an end time in the voice audio signal for each segment.

At step 304, it is determined whether a selected segment of the plurality of segments has a duration, $T_{seg}$, longer than a threshold duration, $T_{thresh}$. The threshold duration can be selected based on a maximum expected duration of speech before a breath is taken. This determining step may be performed before the end time of the selected segment has been identified—i.e. the processing can be performed on speech being currently recorded.

At step 305, a most likely location of a breath in the audio associated with the selected segment is identified. This may comprise identifying a signal energy minimum. It has been found that this identification may be done easily and effectively by finding the point in the selected segment where the signal energy measured over a certain time window is lowest (e.g. looking at the average energy in that time window or sum of signal energy across the time window). For example the time window may be moved through the audio in increments that are smaller than the time window itself, such as increments that are 10% or less the duration of the time window. As sometimes it is not background noise but the speaker breathing noisily that causes the pauses to be missed, the signal can advantageously be low-pass filtered first to help remove the breath noise. The time window for measuring the signal energy may for example be in the range 250-500 ms.

At step 306, the selected segment is divided into sub-segments based on the identified most likely location of a breath. In particular, the start and end times of the sub-segments can be determined. The start and end times may then be passed to a user interface module, as described above, for visualisation on a user interface. These sub-segments may appear on the user interface as a gap between blocks representing segments. For example, the gap 207 in user interface 200 of FIG. 2 is a pause inserted according to the present invention.

The steps 301-306 are then repeated for each identified segment, so that the full voice audio input is divided into segments with no segment having a duration greater than the threshold duration.

The threshold duration may be selected based on the maximum time before the speaker would be expected to take a breath. In particular, a maximum phrase duration $T_{max}$ may be defined. $T_{max}$ represents the longest time an average person may be expected to speak for without taking a breath. $T_{max}$ may particularly be in the range 7-9 seconds.

In some embodiments, the threshold duration may be selected to equal (or approximately equal) the maximum phrase duration $T_{max}$. In such embodiments, when segmenting the audio signal into phrases, the method monitors the duration of a speech segment, and when a segment exceeds $T_{max}$, it searches the audio of that segment for the most likely place a breath would have been taken and splits the segment by inserting a pause at that point.

Since it is very unusual for a speaker to breathe immediately after speaking a short utterance, the search may be restricted away from the ends of the segment. This prevents very short segments being produced by the splitting. To this end, a minimum phrase duration, $T_{min}$, may also be defined. $T_{min}$ is the shortest utterance an average person may be expected to make that is immediately followed by a breath. $T_{min}$ may particularly be in the range 0.5-1.5 seconds.

Figure 4:
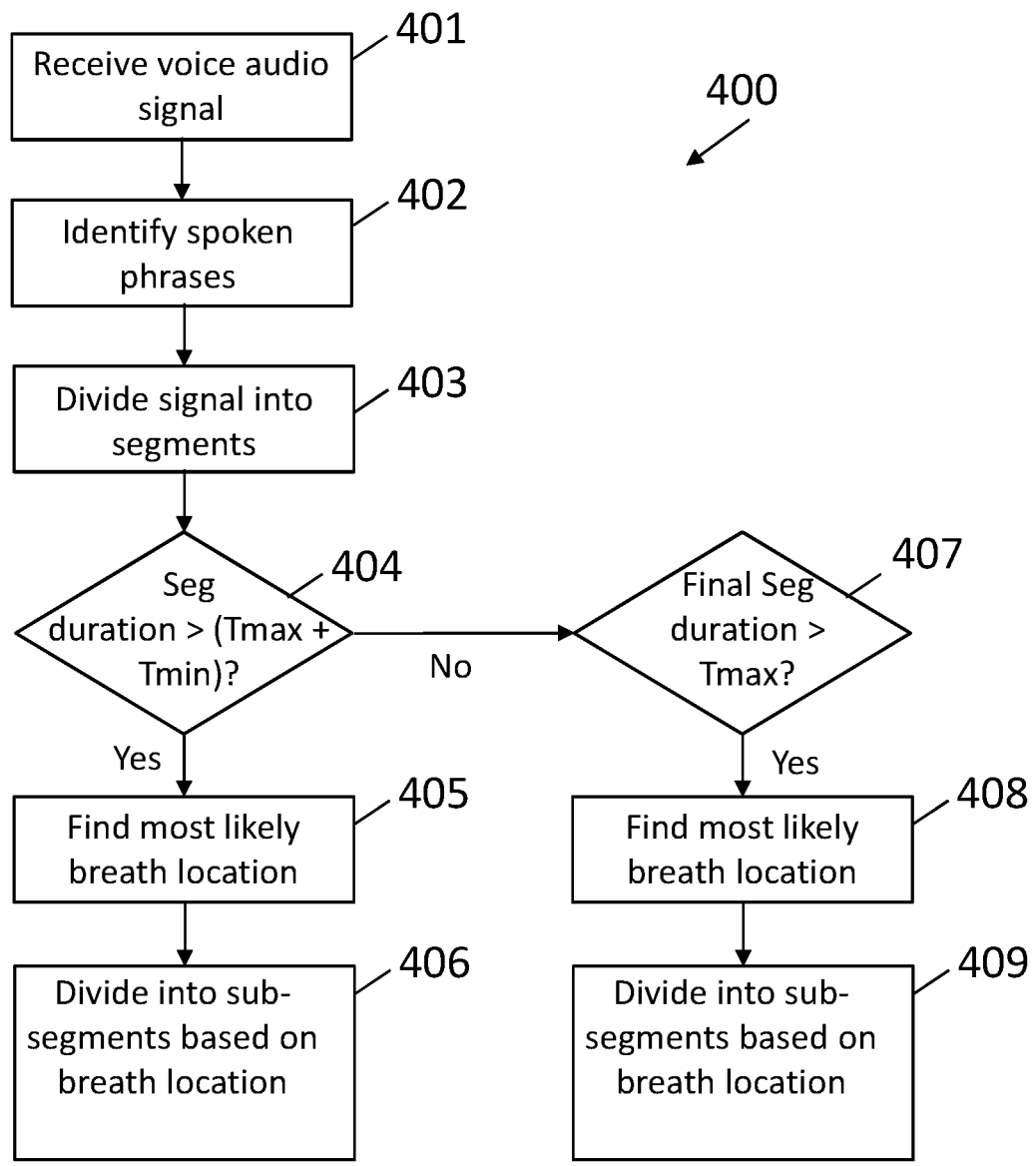
FIG. 4 illustrates an alternative method of processing audio according to the present invention.

The method 300 may particularly be performed when the final duration of the selected segment is not yet be known. In such cases, if $T_{max}$ was used as the search threshold and the final duration of the segment before splitting ends up being less than $T_{max} T_{min}$, there is be a risk that the second of the sub-segments would have a duration less than $T_{min}$ and so would likely not match up with a complete phrase. To avoid this problem, an alternative threshold and alternative search time limits may be used. FIG. 4 illustrates a method 400 according to such embodiments.

Steps 401-403 of method 400 match the corresponding steps of method 300. At step 404, it is determined if a selected segment duration, $T_{seg}$, is longer than a first threshold duration, $T_{thresh1}$, similar to step 304 in method 300.

If it is determined that the duration is longer than the first threshold, the method 400 proceeds to steps 405 and 406, similar to steps 305 and 305 of method 300, in which a most likely location of a breath is identified and the selected segment is divided into sub-segments.

In the particular embodiment illustrated in FIG. 4, the first threshold duration, $T_{thresh1}$, equals the sum of the minimum phrase duration $T_{min}$ and the maximum phrase duration $T_{max}$. When identifying a most likely location of the breath in step 405, the audio associated with the selected segment may be searched within a time window from a time $T_{min}$ after the start of the selected segment to a time $T_{max}$ after the start of the selected segment. This choice of threshold duration and search window ensures that the sub-segments formed will not be shorter than the minimum phrase duration, even though the final duration of the selected segment is not yet known.

However, comparing the duration to $T_{thresh1} = T_{min} + T_{max}$ means that if the selected segment ends with a duration $T_{dur}$ greater than the maximum phrase duration, but less than the first threshold, then a search for a breath would not be performed. This would allow segments to be defined with final durations longer than the expected maximum time a person would speak without taking a breath—and so the segments may not match up to actual phrases in the speech.

To overcome this, the method 400 compares the final duration of the selected segment to a second threshold duration, and if the duration is too long, divides the selected segment into sub-segments.

As shown in FIG. 4, if it is determined in step 404 that the duration of the selected segment does not exceed the first threshold duration, the method 400 moves onto step 407. At step 407, it is determined, after the end point of the selected segment is known, whether the final duration of the selected segment, $T_{dur}$, exceeds a second threshold duration, $T_{thresh2}$. In the particular embodiment illustrated in FIG. 4, the second threshold duration equals the maximum phrase duration, $T_{max}$. This ensures that all segments which are longer than the expected maximum phrase duration are searched for a likely breath location and divided into smaller sub-segments.

If it is determined that the final duration of the selected segment does not exceed the second threshold duration, no action is taken to shorten the selected segment, and the conventionally determined start and end times of the selected segment are recorded. For example, the start and end times of the selected segment may be passed to a user interface module, to be represented on a user interface as a phrase block.

On the other hand, if it is determined that the final duration of the selected segment does exceed the second threshold duration, the method proceeds to step 408.

At step 408, a most likely location of a breath in the audio associated with the selected segment is identified. This process may be similar to that described above in relation to step 305 of method 300. Unlike at step 405, the final duration of the selected segment is now known. The search of the audio for the most likely location of the breath can now be performed in a time window from $T_{min}$ after the start time of the selected segment to $T_{min}$ before the end time of the selected segment. This time window ensures that the sub-segments are not shorter than the minimum phrase duration.

The method then proceeds to step 409, in which the selected segment is divided into sub-segments based on the identified most likely location of a breath. In particular, the start and end times of the sub-segments can be determined, and may be passed to a user interface module for display on a user interface, as described above.

The steps 401-409 are then repeated for each identified segment, so that the full voice audio input is divided into segments with no completed segment having a duration greater than the second threshold duration. The steps 407-409, in which the final duration of a completed segment are compared to the second threshold may be performed at the same time as steps 404-406 are being performed on a subsequent, not yet completed segment.

By performing the methods 300 and 400 described above, segmentation of a voice audio signal may more accurately reflect the phrases originally spoken by the speaker.

Although described above in terms of methods, it will be appreciated that the invention may be embodied in a computer program configured to perform any of the methods described above, or in a computer readable medium comprising instructions which, when executed, perform any of the methods described above.

Although the invention has been described above with reference to one or more preferred embodiments, it will be appreciated that various changes or modifications may be made without departing from the scope of the invention as defined in the appended claims.

LIST OF REFERENCES

[1] Capturing, Structuring and Representing Ubiquitous Audio", Hindus, Schmandt and Homer (ACM Transactions on Information Systems, Vol 11, No. 4 Oct. 1993, pages 376-400). https://www.media.mit.edu/speech/papers/1993/hindus_ACM93_ubiquitous_audio.pdf
[2] "Voice Annotation and Editing in a Workstation Environment" by Ades and Swinehart in a Xerox Corporation publication of 1986. http://bitsavers.trailing-edge.com/pdf/xerox/parc/techReports/CSL-86-3_Voice_Annotation_and_Editing_in_a_Workstation_Environment.pdf
[3] A"A Model based Voice Activity Detector for Noisy Environments", Kaavya Sriskandaraja, Vidhyasaharan Sethu, Phu Ngoc Le, Eliathamby Ambikairajah, Interspeech 2015. https://pdfs.semanticscholar.org/e493/1be6673 cb6067db1c855636bea6c8ab170a5.pdf

The invention claimed is:

1. A method of processing a voice audio signal, the method comprising:
   receiving, at an electronic device, a voice audio signal;
   identifying spoken phrases within the voice audio signal based on the detection of voice activity or inactivity:
   dividing the voice audio signal into a plurality of segments based on the identified spoken phrases, and
   in accordance with a determination that a selected segment of the plurality of segments has a duration $T_{seg}$ longer than a threshold duration $T_{thresh}$, wherein $T_{thresh}$ is selected based on a maximum duration of speech before a breath is taken:
   identifying a most likely location of a breath in the audio associated with the selected segment; and
   dividing the selected segment into sub-segments based on the identified most likely location of a breath.

2. The method of claim 1, wherein identifying a most likely location of a breath comprises searching the audio associated with the selected segment between a first time limit and a second time limit for the most likely location of a breath.

3. The method of claim 1, wherein dividing the voice audio signal into a plurality of segments comprises determining a start time and an end time in the voice audio signal for each segment; and
   wherein the determination that a selected segment has a duration longer than the threshold duration is performed after determining the start time of the selected segment but before determining the end time of the selected segment.

4. The method of claim 3, wherein the first time limit is a predefined minimum phrase duration, $T_{min}$, after the start time of the selected segment.

5. The method of claim 4, wherein the second time limit is a predefined maximum phrase duration, $T_{max}$, after the start time of the selected segment.

6. The method of claim 5, wherein the threshold duration, $T_{thresh}$, equals the sum of the minimum phrase duration, $T_{min}$, and the maximum phrase duration, $T_{max}$.

7. The method of claim 5, wherein the threshold duration is a first threshold duration, and wherein the method further comprises:
   after determining an end time of the selected segment, and in accordance with a determination that the duration of the selected segment does not exceed the first threshold duration:
   determining if the duration of the selected segment exceeds a second threshold duration, wherein the second threshold duration is less than the first threshold duration; and
   if the segment duration exceeds the second threshold duration:
   searching the audio associated with the selected segment between the first time limit and a third time limit for a most likely location of a breath; and
   dividing the selected segment into sub-segments based on the identified most likely location of the breath;

wherein the third time limit equals the duration of the selected segment, $T_{dur}$, minus the minimum phrase duration, $T_{min}$.

8. The method of claim 7, wherein the second threshold duration equals the maximum phrase duration, $T_{max}$.

9. The method of claim 5, wherein the predefined maximum phrase duration, $T_{max}$, is in the range 5-10 seconds or 7-9 seconds.

10. The method of claim 4, wherein the predefined minimum phrase duration, $T_{min}$, is in the range 0.3-2 seconds or 0.5-1.5 seconds.

11. The method of claim 1, wherein identifying a most likely location of a breath in the audio associated with the selected segment comprises identifying a minimum signal energy in the audio associated with the selected segment.

12. The method of claim 11, wherein identifying a minimum signal energy comprises:
searching the audio associated with the selected segment for the minimum signal energy within a moving time window.

13. The method of claim 12, wherein the duration of the time window is in the range 250-500 ms.

14. The method of claim 1, further comprising applying a low-pass filter to the audio associated with the selected segment prior to identifying a most likely location of a breath.

15. The method of claim 1, further comprising displaying, on a display of the electronic device, a visual representation of the segments and sub-segments.

16. A computer program stored on a non-transitory, processor readable storage the computer program configured to:
receive, at an electronic device, a voice audio signal;
identify spoken phrases within the voice audio signal based on the detection of voice activity or inactivity;
divide the voice audio signal into a plurality of segments based on the identified spoken phrases; and
in accordance with a determination that a selected segment of the plurality of segments has a duration $T_{seg}$ longer than a threshold duration $T_{thresh}$, wherein $T_{thresh}$ is selected based on a maximum duration of speech before a breath is taken:
identify a most likely location of a breath in the audio associated with the selected segment; and
divide the selected segment into sub-segments based on the identified most likely location of a breath.

17. A non-transitory, computer readable medium comprising instructions which, when executed by a computer, cause the computer to;
receive, at an electronic device, a voice audio signal;
identify spoken phrases within the voice audio signal based on the detection of voice activity or inactivity;
divide the voice audio signal into a plurality of segments based on the identified spoken phrases; and
in accordance with a determination that a selected segment of the plurality of segments has a duration $T_{seg}$ longer than a threshold duration $T_{thresh}$, wherein $T_{thresh}$ is selected based on a maximum duration of speech before a breath is taken:
identify a most likely location of a breath in the audio associated with the selected segment; and
divide the selected segment into sub-segments based on the identified most likely location of a breath.

* * * * *